United States Patent [19]
Andersson

[11] Patent Number: 4,657,118
[45] Date of Patent: Apr. 14, 1987

[54] ANTI-SKID DEVICE

[75] Inventor: Olle G. Andersson, Linköping, Sweden

[73] Assignee: Onspot AB, Linköping, Sweden

[21] Appl. No.: 726,249

[22] Filed: Apr. 23, 1985

[30] Foreign Application Priority Data

Apr. 27, 1984 [SE] Sweden ................................ 8402335

[51] Int. Cl.⁴ ........................... B60T 1/00; F16C 1/12
[52] U.S. Cl. .................................... 188/4 R; 74/517; 152/208
[58] Field of Search .............. 152/208; 188/4 R, 4 B; 74/517

[56] References Cited

U.S. PATENT DOCUMENTS

| | | | |
|---|---|---|---|
| 1,374,252 | 4/1921 | Thorne et al. | 188/4 B |
| 2,264,466 | 12/1941 | Weisel | 188/4 B |
| 4,299,310 | 11/1981 | Törnebälk | 152/208 X |
| 4,480,720 | 11/1984 | Shimano | 74/517 X |

FOREIGN PATENT DOCUMENTS 156596 5/1954 Australia .
2159709 6/1973 France .

Primary Examiner—Donald Czaja
Assistant Examiner—Thomas Bokan
Attorney, Agent, or Firm—Burns, Doane, Swecker & Mathis

[57] ABSTRACT

Anti-skid device for vehicles including a chain provided pulley (1) arranged rotatable on an arm (4) journalled on a shaft (5). The shaft is connected with an eccentric pulley. Cables (7,7') extend around the eccentric pulley and are also fastened to the eccentric pulley. The two cables are in flexible pipes led to an air cylinder (8) and an air spring (9) respectively and movement of arm and chain provided pulley (1) from parking position to working position is achieved by the air cylinder pulling in the cable that in turn turns the pulley and the connected arm (4). A shelf (15) is arranged below the parking location of the chain provided pulley (1). When the chain provided pulleys are parked the chains are drawn over the edge of the shelf (15) and they are thus pulled up from possible contact with the ground. In this way it is possible to use necessary chain length together with a very low mounting of the device.

6 Claims, 2 Drawing Figures

ANTI-SKID DEVICE

FIELD OF INVENTION

This invention is related to so-called automatic anti-skid devices. Automatic means in this case not that they are activated automatically when driving condition turns slippery, but instead that they can be activated by the driver when the vehicle is moving.

BACKGROUND OF THE INVENTION

Anti-skid devices of automatic kind have been known comparatively long time. The only model yet successfully marketed includes a pulley on which are arranged short pieces of chain. When the pulley is brought into contact with a vehicle wheel, the pulley is rotated and the chains are thrown in under the wheel. This type of anti-skid device requires however, a large amount of space for its mounting and stowage, which in turn means that one has not been able to use it in buses, where the need for it is as great as on trucks and lorries. The reason for this situation is that the air suspension used by most buses today also requires very much space, leaving insufficient space for the known device. In particular it is necessary for anti-skid devices of this kind to locate the stowed position of the pulley comparatively high above the ground, so that the chains do not touch the ground. The height is necessary because the chains, when the pulley is at the stowed position are suspended vertically down from the pulley. Apart from this problem the known devices are also provided with a space consuming mechanism providing the movement from the stowed resting position to the working position in contact with the vehicle wheel.

OBJECTS AND SUMMARY OF INVENTION

With the above problems in view the object of the invention is to provide a compact and adaptable anti-skid device, well suited for mounting on for instance buses and other vehicles, where available space is limited.

The above object is in accordance with the invention solved by providing the device with a shelf, under the stowed location of the chain pulley so that the shelf will collect and hold up the chains when a lateral movement of the chain pulley brings it over the shelf. The chain pieces are thus prevented from contacting the ground even though the distance between the pulley in stowed, resting position and the ground is less that the length of the chains. In this way the necessary height for the invented device is efficiently reduced.

In order to enhance the use of the available space the invention provides in accordance with a further characteristic a possibility of locating the stowed position of the chain pulley as well as the chain supporting shelf a long distance from the working position. This object is achieved by connecting a chain pulley carrying arm at its inner end with a pulley, which in turn is connected by bowden-wires to an air cylinder as well as a spring for the return movement. The spring can be a gas spring or of course also an air cylinder. In this way it is possible for the chain pulley carrying arm to carry out a movement in excess of 180°, making it possible to place the resting location of the chain pulley a long way from the vehicle wheel without increase in the length of the arm.

In some instances, such as with double mounted wheels, it may however be necessary to provide arms that are so long that the chain pulleys, when moved from stowed positions to working positions, will come in contact with each other. In accordance with a further development of the invention any fouling contact between the arms is prevented by choking the air connections for one of the air cylinders. In this way the pressure will build up and fall faster in the other cylinder when activated or deactivated. The choked side will always be slower and the critical possible contact point will be passed at different times.

In accordance with another aspect of the invention, the arms may be pivoted by an arrangement including an eccentric drive pulley wheel or wheels, spring and maneuvering cylinders and bowden-wires extending from the cylinders to the drive pulley wheels. The arrangement ensures maximum forces for the contact of the chain pulley with the vehicle wheel as well as at the stowed location. The provision of an air spring has the advantage of giving a full force even in the stowed position.

The shelf is preferably made of a resilient low-friction material, for instance plastic and may of course be constituted by a flat shelf or have a molded shape with lateral up drawn edges, in order to keep the chains from contact with the ground.

As is easily understood from the above discussion, the air cylinder as well as the spring can be placed anywhere where there is available space, because force and movement are transferred via the bowden-cables.

BRIEF DESCRIPTION OF THE DRAWING

Further details and features of the invention will be apparent from the following description of a preferred embodiment shown in the drawings wherein.

DETAILED DESCRIPTION OF THE PREFERRED EMBODIMENT

Figure 1:
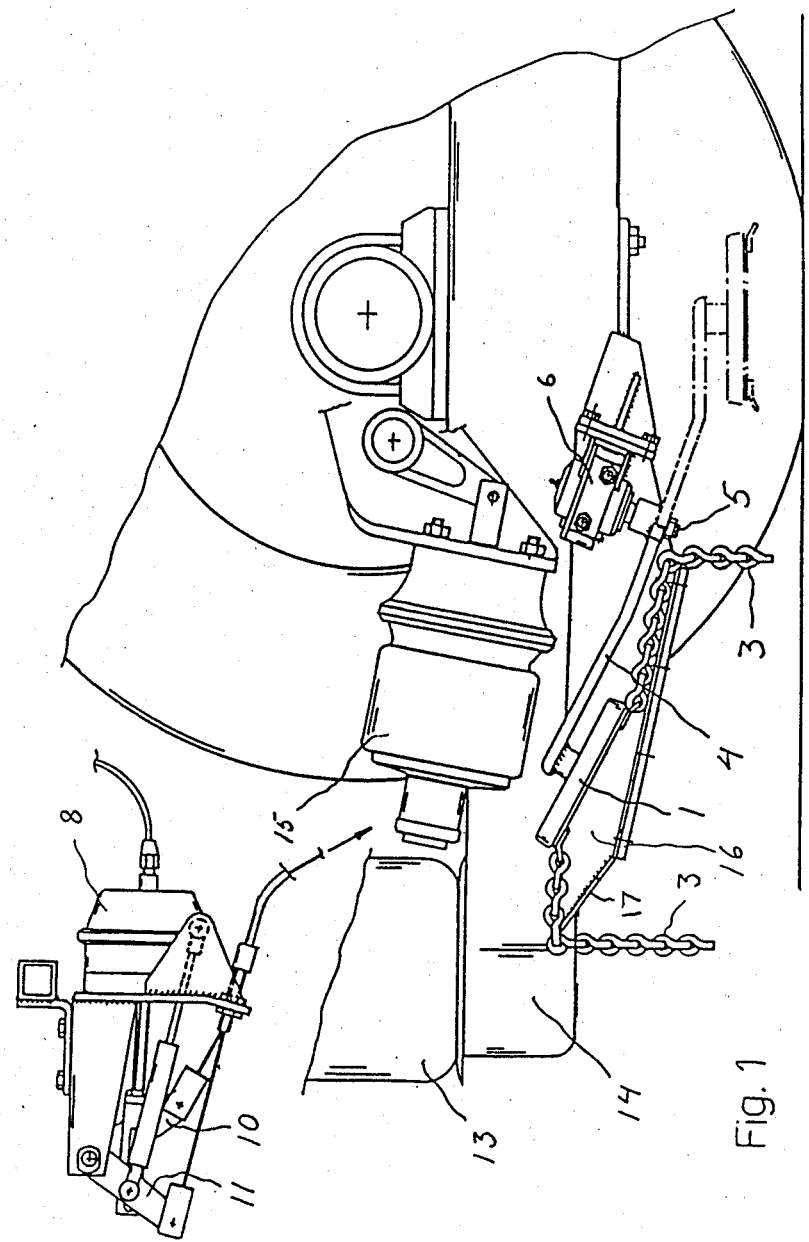
FIG. 1 is a side view of the device in accordance with the preferred embodiment of the invention.
Figure 2:
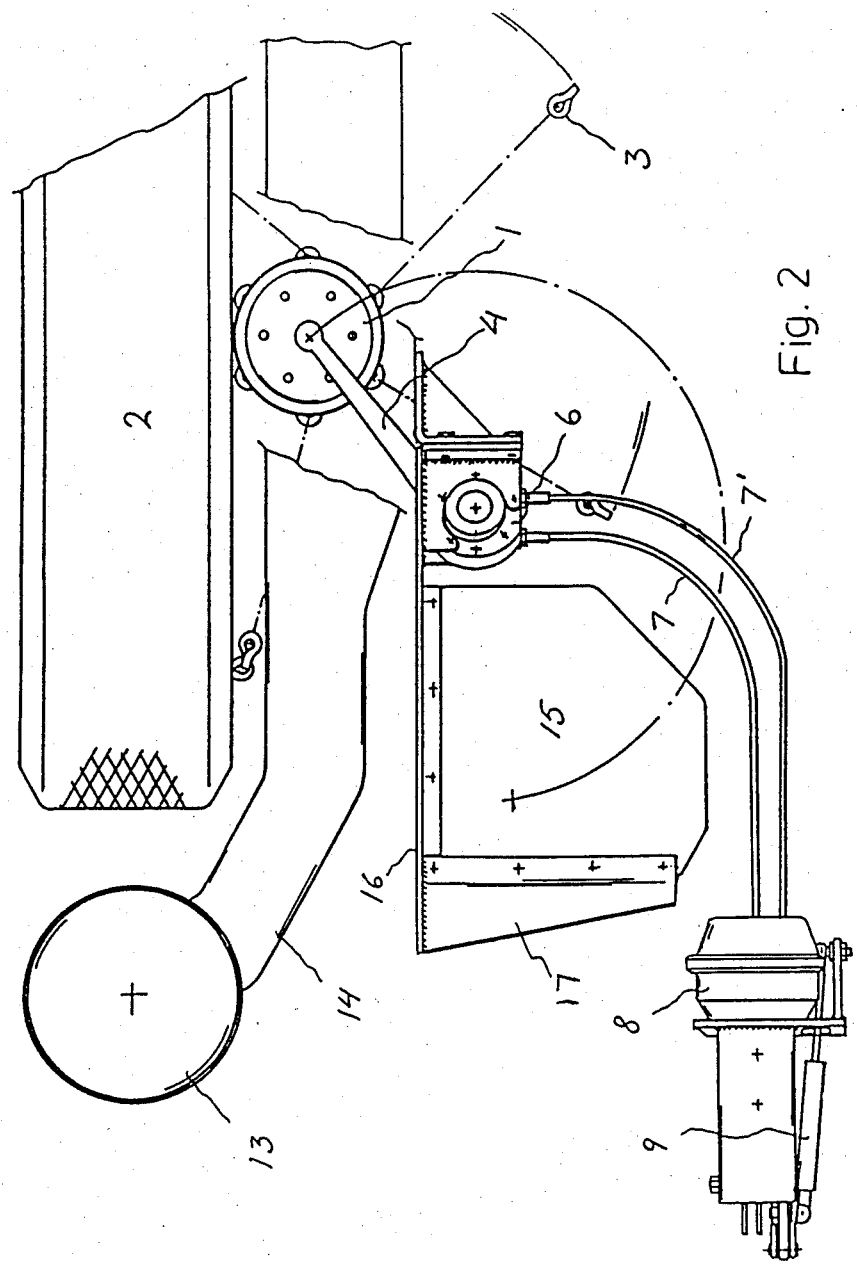
FIG. 2 is top view of the same device.

In FIG. 2, an anti-skid device in accordance with a preferred embodiment of the invention is shown with the chain pulley 1 in its working position in contact with the vehicle wheel 2. The stowed or resting location of the chain pulley is shown in FIG. 1. The short chain pieces 3 on the chain provided pulley 1 are thrown outwardly when the pulley is rotated and a movement sequence that is indicated in FIG. 2. The chain pulley 1 is journalled in an arm 4, that in turn is fastened to a shaft 5 journalled in a housing 6. The arm is fastened to the shaft 5 at its lower end, and inside the housing, a drive pulley wheel is fixed on the shaft. Fastened to this drive pulley wheel and extending around it are the ends of bowden-cables 7 and 7'. The other ends of the bowden-cables are connected to an air cylinder and an air spring, respectively. The outer flexible pipings of the bowden-cables are fastened at one end to the housing 6 and at the other end to a subframe carrying an air cylinder 8 and spring 9. The subframe is in turn fastened to the vehicle. The couplings between air cylinder 8 and air spring 9 and the respective ends of the cable 7 and 7' are not direct in this case but via lever arms 10 and 11 journalled in the subframe. The drive pulley wheel is arranged eccentrically on the subshaft 5 so that maximum torque from air cylinder and air spring respectively is obtained when the chain pulley is in working position or parking position respectively. This in turn means that air cylinder and air spring can be made smaller and more cheaply.

Below the parking position of the chain provided pulley 1 a shelf 15 is provided, fabricated from a plastic, low friction material, for instance polyurethane. The housing 6 and the shelf are connected to a supporting frame 16 that in turn is fastened to the vehicle.

Referring in particular to FIG. 1, the shelf 15 is arranged relatively closely under the chain provided pulley in its stowed position and the intermediate space is only enough for the chains. In this way, the chains will be out from the shelf when the device is activated.

The shelf is more horizontal than the chain provided pulley and the chains hang over the edge of the shelf. The shelf is on two sides restricted by the subframe 16 and an oblique edge extension 17. If the chains by the rotation of the chain pulley when brought to the parking position are thrown over the edge extension, this is no problem since the chains on activation are moved essentially parallel to this edge. In case the shelf is moulded from high molecular plastic, the edge extension may of course be integral with the shelf, which may also be given a bowl-shape.

To indicate the space restrictions the air cylinder 13, suspension beam 14 and the brake cylinder 15 of the vehicle are shown.

It is to be understood that the present invention may be embodied in other specific forms without departing from the spirit or essential characteristics of the present invention. The preferred embodiment is therefore to be considered illustrative and not restrictive. The scope of the invention is indicated by the appended claims rather than by the foregoing descriptions and all changes or variations which fall within the meaning and range of the claims are therefore intended to be embraced therein.

What I claim is:

1. An anti-skid device for use with a vehicle having a wheel, said device comprising a rotatable chain pulley provided with chain pieces, means for moving said chain pulley from a stowed location to a working position and a shelf, the chain pulley at the working position being in contact with a side of the vehicle wheel so that the chain pulley is rotated by the wheel, whereby the chain pieces are directed under the vehicle wheel as the chain pulley is rotated, the movement of the chain pulley from the working position to the stowed location being generally lateral, the shelf being affixed to the vehicle so as to be stationary relative to the stowed location, said shelf being positioned beneath the stowed location, the shelf being wider than the chain pulley and positioned relative to said chain pulley at said stowed location so that the shelf draws up sufficient portions of the chain pieces when the chain pulley is moved to the stowed location to prevent chain pieces from contacting the ground, whereby the shortest vertical distance from the pulley wheel at the stowed location to the ground is less than a length of one of the chain pieces.

2. The device according to claim 1, wherein the shelf is fastened to a frame which is fastened to the vehicle, the means for moving the chain pulley including an arm which carries the pulley, said arm having an end pivotally connected to said frame.

3. The device according to claim 2, wherein the means for moving the chain pulley also includes a drive pulley wheel operatively connected to the pivotally connected end of the arm, and means for applying torque to the drive pulley wheel.

4. The device according to claim 3 characterized in that, wherein the torque applying means includes an air cylinder, an air spring and bowden-cable means operatively connecting the air cylinder and the air spring to the drive pulley wheel.

5. The device according to claim 4, wherein the drive pulley wheel is arranged eccentrically so that force from the air cylinder through the bowden-cable means provides maximum torque at the working position of the chain pulley and torque achieved from force from the air spring is minimum at the working position of the chain pulley, and that the relations are reversed at the stowed location.

6. The device according to claim 4, wherein a pair of the anti-skid devices are positionable at opposite sides of the vehicle, an air supplying connection to the air cylinder of a first one of the pair of devices being more constricted than an air supplying connection of the air cylinder of the second one of anti-skid devices so as to achieve a slower movement for the arm of the, first anti-skid device, whereby the arms of the anti-skid devices may operate without fouling against each other.

* * * * *